US008997048B1

(12) United States Patent
Pomerantz et al.

(10) Patent No.: US 8,997,048 B1
(45) Date of Patent: Mar. 31, 2015

(54) METHOD AND APPARATUS FOR PROFILING A VIRTUAL MACHINE

(75) Inventors: Omer Pomerantz, Herzlia (IL); David Glushko, Kazrin (IL); Ami Navon, Tel-Aviv (IL)

(73) Assignee: Oracle America, Inc., Redwood Shores, CA (US)

( * ) Notice: Subject to any disclaimer, the term of this patent is extended or adjusted under 35 U.S.C. 154(b) by 1695 days.

(21) Appl. No.: 11/705,941

(22) Filed: Feb. 14, 2007

(51) Int. Cl.
*G06F 9/445* (2006.01)
*G06F 11/36* (2006.01)
*G06F 11/34* (2006.01)

(52) U.S. Cl.
CPC ........ *G06F 11/3636* (2013.01); *G06F 11/3414* (2013.01); *G06F 11/3668* (2013.01)
USPC ............................ 717/124; 717/130; 717/131

(58) Field of Classification Search
CPC . G06F 9/445; G06F 9/44553; G06F 11/3636; G06F 11/3612; G06F 11/3664; G06F 11/3414
USPC .................. 717/100, 124, 130, 131
See application file for complete search history.

(56) References Cited

U.S. PATENT DOCUMENTS

| | | | |
|---|---|---|---|
| 5,440,735 | A | 8/1995 | Goldring |
| 5,448,739 | A | 9/1995 | Jacobson |
| 5,621,912 | A * | 4/1997 | Borruso et al. ............ 718/1 |
| 6,041,344 | A | 3/2000 | Bodamer et al. |
| 6,094,684 | A | 7/2000 | Pallmann |
| 6,145,121 | A | 11/2000 | Levy et al. |
| 6,167,405 | A | 12/2000 | Rosensteel, Jr. et al. |

(Continued)

FOREIGN PATENT DOCUMENTS

| | | |
|---|---|---|
| EP | 1610238 A2 | 12/2005 |
| WO | 02097664 A1 | 12/2002 |

(Continued)

OTHER PUBLICATIONS

"Viswanathan, D";"Java Virtual Machine Profiler Interface ";"2000";"IBM systems journal";"vol. 39, issue 1";"pp. 82-95".*

(Continued)

*Primary Examiner* — Wei Zhen
*Assistant Examiner* — Brahim Bourzik
(74) *Attorney, Agent, or Firm* — Park, Vaughan, Fleming & Dowler LLP (57) ABSTRACT

One embodiment of the present invention provides a system for profiling a virtual machine on an embedded device. During operation, the system receives an operation-request at a system-level profiler from a virtual machine on an embedded device. The system then records the operation-request in a system-level log. Next, the system sends the operation-request to a native layer on the embedded device. Then, the system receives an operation-response associated with the operation-request from the native layer. The system then records the operation-response in the system-level log. Next, the system sends the operation-response to the virtual machine, thereby facilitating logging of interactions between the virtual machine and the native layer. Note that logging interactions between the virtual machine and the native layer facilitates emulation of the platform independent virtual machine on a second device. Furthermore, note that logging interactions between the virtual machine and the native layer can facilitate emulation of the platform independent virtual machine executing a specific application on a second device.

15 Claims, 5 Drawing Sheets

(56) References Cited

U.S. PATENT DOCUMENTS

| | | |
|---|---|---|
| 6,236,997 B1 | 5/2001 | Bodamer et al. |
| 6,253,228 B1 | 6/2001 | Ferris et al. |
| 6,530,078 B1 * | 3/2003 | Shmid et al. ............... 717/138 |
| 6,539,339 B1 * | 3/2003 | Berry et al. ................ 702/186 |
| 6,629,313 B1 | 9/2003 | Rowe et al. |
| 6,769,054 B1 | 7/2004 | Sahin et al. |
| 6,775,826 B1 | 8/2004 | Zahavi et al. |
| 6,813,731 B2 | 11/2004 | Zahavi et al. |
| 6,854,113 B1 * | 2/2005 | Sankar et al. ................... 718/1 |
| 6,877,095 B1 | 4/2005 | Allen |
| 6,934,934 B1 * | 8/2005 | Osborne et al. ............. 717/126 |
| 7,076,480 B2 | 7/2006 | Scardo et al. |
| 7,086,064 B1 * | 8/2006 | Stevens ....................... 719/310 |
| 7,194,761 B1 | 3/2007 | Champagne |
| 7,266,810 B2 * | 9/2007 | Karkare et al. ............. 717/130 |
| 7,415,522 B2 | 8/2008 | Kaluskar et al. |
| 7,757,214 B1 * | 7/2010 | Palczak et al. ............. 717/121 |
| 7,890,458 B2 | 2/2011 | Dias |
| 2003/0093252 A1 * | 5/2003 | Frankel et al. ................ 703/13 |
| 2003/0172091 A1 | 9/2003 | Norcott |
| 2004/0015600 A1 | 1/2004 | Tiwary et al. |
| 2004/0158589 A1 * | 8/2004 | Liang et al. ................. 707/206 |
| 2004/0221115 A1 | 11/2004 | Sahin et al. |
| 2005/0038849 A1 | 2/2005 | Kaluskar et al. |
| 2005/0055383 A1 | 3/2005 | Dias et al. |
| 2005/0131879 A1 | 6/2005 | Ghosh et al. |
| 2005/0131881 A1 | 6/2005 | Ghosh et al. |
| 2005/0186975 A1 | 8/2005 | Yach et al. |
| 2006/0155667 A1 * | 7/2006 | Tolba ............................... 707/1 |
| 2007/0011667 A1 * | 1/2007 | Subbiah et al. ............. 717/148 |
| 2007/0067373 A1 * | 3/2007 | Higgins et al. .............. 707/206 |
| 2007/0081966 A1 | 4/2007 | Behler et al. |
| 2008/0005782 A1 * | 1/2008 | Aziz ................................. 726/3 |
| 2008/0008141 A1 * | 1/2008 | Tchigevsky et al. .......... 370/338 |
| 2008/0028401 A1 * | 1/2008 | Geisinger ......................... 718/1 |

FOREIGN PATENT DOCUMENTS

| | | |
|---|---|---|
| WO | 03005202 A1 | 1/2003 |
| WO | 03009139 A1 | 1/2003 |

OTHER PUBLICATIONS

"Dunlap et al", "ReVirt: Enabling Instruction Analysis Through Virtual-Machine Logging and Replay","2002";"acm";"14 pages".*

Michele Cyran "5 Schema Objects" downloaded form the Internet Apr. 12, 2007 <http://oracle-docs.darthmouth.edu/dba-docs/10gdocs/server.101/b10743/schema.htm> pp. 11-14.

Terri Winters "6 Application Builder Concepts" downloaded from the Internet Apr. 12, 2007 <http://oracle-docs.darthmouth.edu/dba-docs/10gdocs/appdev.101/b10992/mvl_fund.htm> p. 11.

Dias, K. et al. "Automatic Performance Diagnosis and tuning in Oracle", XP-002470748, CIDR Conference, 2005,. 12 pages.

* cited by examiner

METHOD AND APPARATUS FOR PROFILING A VIRTUAL MACHINE

RELATED APPLICATION

The subject matter of this application is related to the subject matter in a co-pending non-provisional application by the same inventors as the instant application and filed on the same day as the instant application entitled, "METHOD AND APPARATUS FOR TESTING AN APPLICATION RUNNING IN A VIRTUAL MACHINE," having Ser. No. 11/706,106.

BACKGROUND

1. Field of the Invention

The present invention relates to embedded devices. More specifically, the present invention relates to a method and apparatus for profiling a virtual machine on an embedded device.

2. Related Art

Today, developers are creating a multitude of applications for resource-constrained systems, such as embedded devices. Many of these applications are written to be executed on virtual machines, such as the Java Virtual Machine (JVM). For each type of device that executes these applications, developers typically test applications on virtual machines which are configured to execute their applications on the device. However, because of resource limitations, it is difficult to fully test a virtual machine on many of these resource-constrained systems. For example, tests that rely on significant additional code are often not feasible due to memory constraints. Therefore, testing on many portions of the virtual machine are limited to ineffective "guess and check" testing methods.

One solution to the above-mentioned problem is to test the virtual machine outside of the resource-constrained system. However, this is problematic because resource-constrained systems generally lack some of the functionality that is present in devices that are not resource-constrained. Therefore, developers often try to implement this functionality by using the available resources and functions of the resource-constrained systems in unusually complex ways. As a result, it is difficult to test the added functionality of the virtual machine created for the resource-constrained system without the resource-constrained system. Furthermore, there is no way to test the resource-constrained system in real-world scenarios without the virtual machine. Therefore, testers perform most testing of the virtual machine in conjunction with the resource-constrained system.

One technique for testing an application that runs on a virtual machine on a resource-constrained system is to compile a profile of the application's execution. These profiling techniques typically operate by profiling operation-requests made by the application within the virtual machine. While this technique may detect the existence of a problem, such as bottleneck, it typically cannot determine whether the problem, exists in the application, the virtual machine, or the resource-constrained system.

Hence, what is needed is a technique for testing an application and an associated virtual machine on a resource-constrained system without the problems described above.

SUMMARY

One embodiment of the present invention provides a system for profiling a virtual machine on an embedded device. During operation, the system receives an operation-request at a system-level profiler from a virtual machine on an embedded device. The system then records the operation-request in a system-level log. Next, the system sends the operation-request to a native layer on the embedded device. Then, the system receives an operation-response associated with the operation-request from the native layer. The system then records the operation-response in the system-level log. Next, the system sends the operation-response to the virtual machine, thereby facilitating logging of interactions between the virtual machine and the native layer. Note that logging interactions between the virtual machine and the native layer facilitates emulation of the platform independent virtual machine on a second device. Furthermore, note that logging interactions between the virtual machine and the native layer can facilitate emulation of the platform independent virtual machine executing a specific application on a second device.

In a variation on this embodiment, the system sends the system-level log to a database. This enables the second device to load the system-level log from a network.

In a variation on this embodiment, the system uses the system-level log to emulate the virtual machine on the second device. During emulation, the system retrieves the operation-request from the system-level log. Next, the system sends the operation-request to the second device. Then, the system receives a second operation-response associated with the operation-request from the second device. The system then records the second operation-response in a second system-level log. Note that, by following this embodiment, the system can emulate a specific application executing on the virtual machine.

In a further variation, the system analyzes the second system-level log to detect problems with the second device. This can include: detecting problems with the functionality of the second device; detecting problems with the design of the second device; detecting problems with the execution of a virtual machine on the second device; detecting problems with the execution of a specific application executing on a virtual machine that is executing on the second device; and any other problem with the second device that can be detected by analyzing the second system-level log.

In a variation on this embodiment, the native layer can be an operating system, and/or a low level-code library.

In a variation on this embodiment, in response to receiving the operation-response, the system performs a pre-defined action. This pre-defined action can involve: recording device statistics for the embedded device; recording the time between the operation-response and a second operation-response; sending the system-level log to a server; sending the system-level log to a database; and any other pre-defined action that the system can perform in response to receiving the operation-response.

In a variation on this embodiment, recording the operation-request involves recording device statistics for the embedded device. These device statistics can include: an available-memory value; a memory in use value; and a processor-load value.

In a variation on this embodiment, the system analyzes the system-level log to detect problems with: the virtual machine, the native layer, and the interaction between the virtual machine and the native layer.

One embodiment of the present invention provides a system for testing an application running on a virtual machine. Note that this involves the system profiling the application, and determining when the virtual machine is executing code in response to commands from the application and when a device hosting the virtual machine is executing code in response to commands from the virtual machine. During operation, the system executes the application. In response to executing the application, the system receives a code-level log associated with the application from a code-level profiler. Then, using a system-level profiler, the system creates a system-level log associated with the application. Next, the system combines the code-level log and the system-level log to produce a profile of the application. The system then analyzes the profile to determine if a problem exists in the application. Note that this can include identifying performance bottlenecks and "hot spots," which is code that is continually or frequently executed, and thus, facilitating removing application bugs and improving application efficiency.

In a variation on this embodiment, analyzing the profile involves determining if a problem exists in a device which hosts the application. Note that this can include determining if a problem exists in the device hardware, or the device's native code.

In a variation on this embodiment, analyzing the profile involves determining if a problem exists with: the application; the virtual machine; the device; and the interaction between the application, the virtual machine, and the device.

In a variation on this embodiment, the code-level profiler records the interactions of the application with the virtual machine in the code-level log.

In a variation on this embodiment, the system-level profiler records the interactions between the virtual machine and the device.

In a further variation, the system-level profiler records device statistics for the device. These device statistics can include: an available-memory value; a memory in use value; and a processor-load value.

In a variation on this embodiment, combining the code-level log and the system-level log also involves sorting the profile into a temporal ordering.

In a variation on this embodiment, analyzing the profile involves determining if a bottleneck associated with the execution of the application in a device exists. This bottleneck can include: a memory-bottleneck (or memory-usage bottleneck); a processor-bottleneck; an output-bottleneck; and any other performance bottleneck that can affect the execution of the application in the device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a framework for profiling a virtual machine, such as the Java Virtual Machine (JVM). A user can use this framework for monitoring, logging, analyzing, and reproducing the program flow of applications running in a virtual machine, such as the Java Micro Edition (JME) JVM, on an embedded device, such as a cellular phone. Furthermore, this framework enables decoupling of operation-requests from the implementation and behavior of the operation-requests on an embedded device. Decoupling operation-requests from their implementation and their behavior facilitates analyzing the program flow of an application, verifying the execution of a virtual machine, and partially or completely emulating the execution of the virtual machine or the embedded device. Moreover, decoupling operation-requests from their implementation and their behavior enables faster and simpler debug and verification cycles, and thus results in shorter development cycles.

In one embodiment of the present invention, the framework includes a system-level profiler, an analyzer component, and an emulator component. The system-level profiler is a call recorder that facilitates intercepting and storing (in an ordered system-level log) operation-requests and interactions between a virtual machine and a native layer. Note that the native layer can be an operating system or a set of low-level code libraries.

In one embodiment of the present invention, the analyzer component enables offline analysis and examination of the ordered system-level log. This embodiment facilitates: detecting problems with the virtual machine and the embedded device; analyzing abnormal application behavior; and examining and comparing flow patterns of the virtual machine and its interactions with the embedded device.

In one embodiment of the present invention, using the system-level log, the emulator component reproduces and executes the partial or the complete interaction of the virtual machine with the native layer of a device on a second device. Note that the second device may or may not have a virtual machine, or the same type of virtual machine installed on the second device. Furthermore, note that the second device may or may not have the same applications installed that the first device has installed.

One embodiment of the present invention provides an application-test system that produces a profile of an application, such as a Java MIDlet. This profile includes a temporal breakdown of the execution of each application method, each virtual machine operation-request, and each native layer operation-response.

In one embodiment of the present invention, the application-test system executes an application in a virtual machine on a device. While executing the application, the application-test system uses the framework for profiling a virtual machine to create a system-level log that includes the interactions of the virtual machine with the native layer of the device. Then, the application-test system receives a code-level log that includes the interactions of the application with the virtual machine from the device. Next, the application-test system combines the system-level log and the code-level log to obtain a profile of the application that includes the method calls of the application and the interactions of the virtual machine with the native layer of the device. The application-test system then sorts the profile into a temporal ordering. At this point, the application-test system can analyze the profile to identify any bottlenecks and/or problems associated with the execution of the application in the virtual machine on the device. This embodiment enables determining if the root cause of a problem with the execution of the application is in the application, the virtual machine, the device, or the native layer of the device.

Computing Environment

Figure 1:
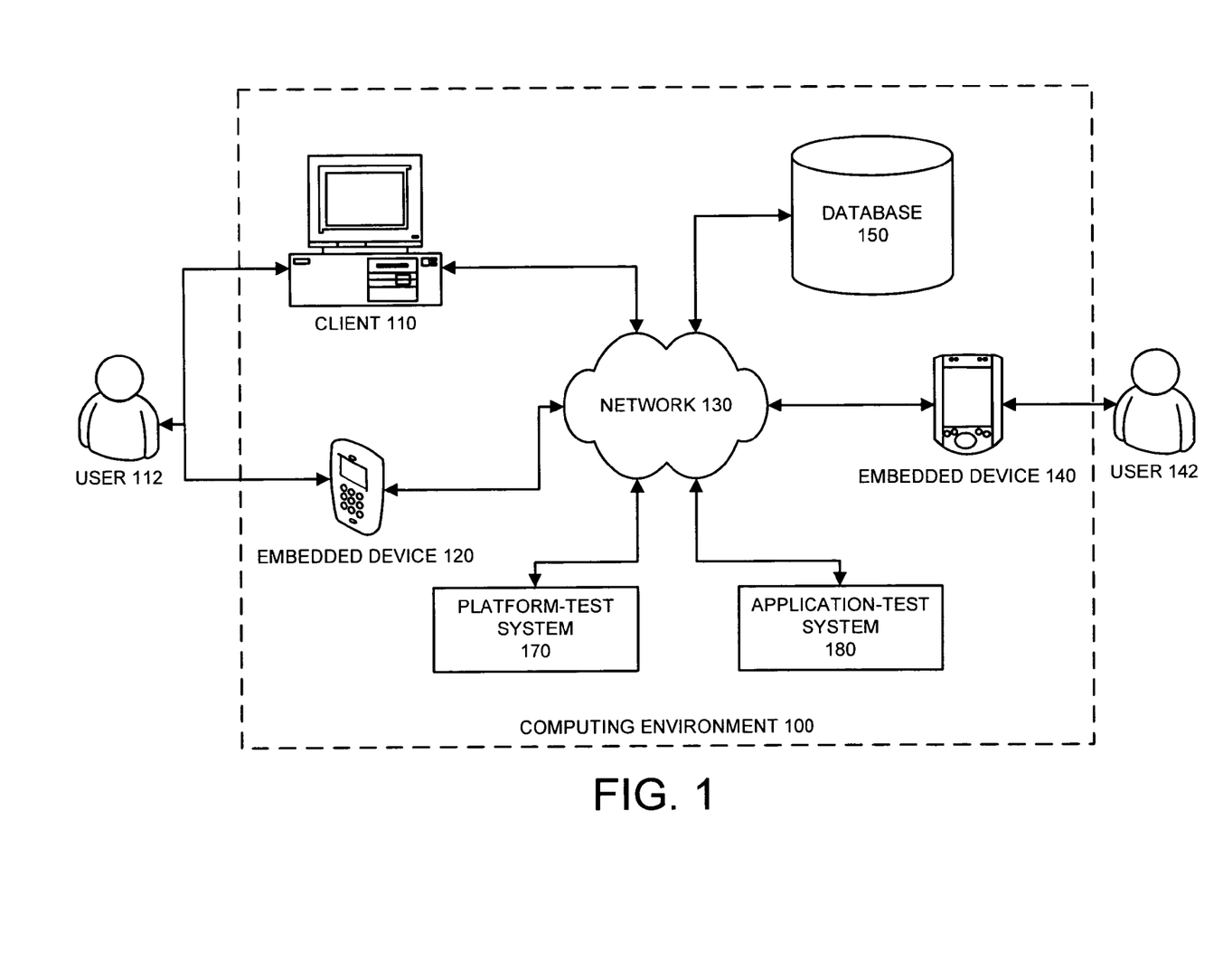
FIG. 1 illustrates a computing environment in accordance with an embodiment of the present invention.

FIG. 1 illustrates a computing environment 100 in accordance with an embodiment of the present invention. Computing environment 100 includes a number of computer systems. These computer systems can generally include any type of computer system based on a microprocessor, a mainframe computer, a digital signal processor, a portable computing device, a personal organizer, a device controller, or a computational engine within an appliance. More specifically, computing environment 100 includes client 110, embedded device 120, network 130, embedded device 140, database 150, platform-test system 170, and application-test system 180.

Client 110 can generally include any node on a network including computational capability and including a mechanism for communicating across the network.

Embedded devices 120 and 140 can generally include any resource-constrained client, such as a cellular phone or a television. In one embodiment of the present invention, embedded devices 120 and 140 only include enough resources to perform a limited set of pre-defined functions. Note that the illustrations used in FIG. 1 to represent embedded devices 120 and 140 differ from each other to illustrate the fact that embedded device 120 is of a different design than embedded device 140.

In one embodiment of the present invention, embedded device 120 is of the same design as embedded device 140.

Network 130 can generally include any type of wired or wireless communication channel capable of coupling together computing nodes. This includes, but is not limited to, a local area network, a wide area network, or a combination of networks. In one embodiment of the present invention, network 130 comprises the Internet.

Database 150 can generally include any type of system for storing data in non-volatile storage. This includes, but is not limited to, systems based upon magnetic, optical, and magneto-optical storage devices, as well as storage devices based on flash memory and/or battery-backed up memory. In one embodiment of the present invention, database 150 can be a server.

Platform-test system 170 can generally include any type of system for testing a platform. Note that a platform can be any type of hardware system, software system, or combination of a hardware system and a software system for executing applications. Furthermore, a platform can include a virtual machine, such as the Java Virtual Machine (JVM). (Note that Java Virtual Machine and JVM may be a trademark of Sun Microsystems, Inc., which may be registered in the United States and/or other countries.)

Application-test system 180 can generally include any type of system for testing an application. More specifically, application-test system 180 can include any system for testing an application that runs in a virtual machine and executes on an embedded device.

In one embodiment of the present invention, platform-test system 170 includes application-test system 180.

In one embodiment of the present invention, embedded device 120 includes platform-test system 170.

In one embodiment of the present invention, embedded device 120 includes application-test system 180.

In one example, suppose a user 112 wants to test a virtual machine, which user 112 designed to run on embedded client 120, to determine if the virtual machine and embedded client 120 are functioning as user 112 intended. To test the virtual machine, user 112 uses platform-test system 170 to record in a system-level log the interactions between the virtual machine and a native layer, such as a host operating system, on embedded client 120. Note that recording the interactions can involve recording device statistics, such as the total memory available and the amount of memory in use after the virtual machine has issued a particular command to the native layer. User 112 can then use platform-test system 170 to analyze the data in the system-level log to determine if a problem exists with embedded device 120 or the implementation of the virtual machine. User 112 can then test design modifications to embedded device 120 or modifications to the virtual machine by using a playback feature of platform-test system 170 to emulate the virtual machine on client 110.

For example, suppose that the result of analyzing the system-level log indicates that after a few minutes embedded device 120 no longer responds to commands issued by the virtual machine because a buffer is not being cleared properly. User 112 can then modify the design of embedded device 120 and can simulate the modified embedded device 120 on client 110. Then, user 112 can playback the system-level log on client 110 to emulate the virtual machine on the simulated modified embedded device 120. This enables user 112 to test modifications to embedded device 120 under the same conditions that caused embedded device 120 to fail without the time and expense of creating a new version of embedded device 120 and trying to recreate the conditions that led to embedded device 120 failing. This is particularly useful if it is difficult to manually and accurately recreate the conditions that led to embedded device 120 failing.

In one example, suppose user 142 is testing embedded device 140, which has the same architecture as embedded device 120. Furthermore, suppose that user 112 has successfully tested a virtual machine on embedded device 120. Then, user 112 can send user 142 a set of system-level logs from tests on embedded device 120 to facilitate testing embedded device 140. User 142 can then instruct platform-test system 170 to test embedded device 140 by using the set of system-level logs to help emulate a known working virtual machine on embedded device 140. This technique is useful for testing systems that are still in production and do not have the capability to load a fully developed virtual machine. Furthermore, this technique is useful for systems that do not have the resources to load a virtual machine that has been expanded by test code and/or requires additional resources to execute the test code.

In one example, suppose user 112 uses application-test system 180 to test an application running in a virtual machine on embedded device 120. In this example, application-test system 180 uses platform-test system 170 to obtain a system-level log of the application running on embedded device 120. Next, application-test system 180 obtains a code-level log, which includes a profile of the interactions of the application with the virtual machine, from embedded device 120. Note that the code-level log differs from the system-level log, which includes a profile of the interactions between the virtual machine and the native layer of embedded device 120. After receiving the system-level log and the code-level log, application-test system 180 combines and sorts the two logs in a temporal ordering to obtain a profile of the application. Application-test system 180 then analyzes the profile to conduct a performance analysis of the application or embedded device 120, or to determine if a problem exists with the application or embedded device 120. For example, if the application is executing slowly, and the profile indicates that a significant amount of the application's execution time is spent waiting to receive input from embedded device 120, user 112 may determine that there is a bug in embedded device 120. However, if the profile indicates that the memory in embedded device 120 is constantly full, user 112 may determine that the application's design does not enable embedded device 120 to efficiently execute the application, or user 112 may determine that a bug exists in the application's design.

Embedded Device

Figure 2A:
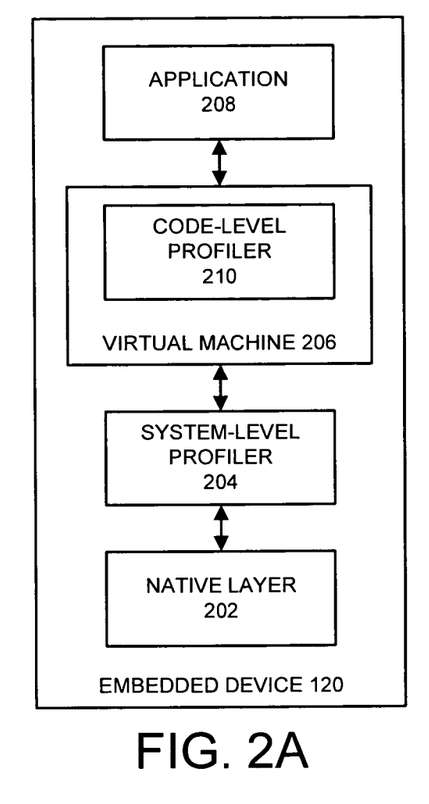
FIG. 2A illustrates an embedded device in accordance with an embodiment of the present invention.

FIG. 2A illustrates an embedded device 120 in accordance with an embodiment of the present invention. Embedded device 120 includes native layer 202, system-level profiler 204, and virtual machine 206.

Native layer 202 can generally include any system that enables a software application to communicate with the hardware that comprises embedded device 120. For example, native layer 202 can include an operating system or a low-level code library. In one embodiment of the present invention, native layer 202 includes the hardware that comprises embedded device 120.

System-level profiler 204 can generally include any system that is capable of creating a system-level log of the interactions between virtual machine 206 and native layer 202. In one embodiment of the present invention, the system-level log records interactions between virtual machine 206 and embedded device 120. Note that the system-level log can include device statistics for embedded device 120, such as the amount of memory in use at a given point in time. Furthermore, system-level profiler 204 can record the interactions between virtual machine 206 and native layer 202 without any modifications to virtual machine 206, native layer 202, or embedded device 120. Moreover, system-level profiler 204 is capable of communicating with database 150. This enables system-level profiler 204 to store the system-level log on database 150, which further enables platform-test system 170 and application-test system 180 to access the system-level log.

In one embodiment of the present invention, virtual machine 206 includes system-level profiler 204.

In one embodiment of the present invention, platform-test system 170 includes system-level profiler 204.

In one embodiment of the present invention, virtual machine 206 includes platform-test system 170.

Virtual machine 206 can generally include any system capable of executing application 208. Furthermore, virtual machine 206 can include code-level profiler 210.

Application 208 can generally include any application capable of running in a virtual machine, such as virtual machine 206.

Code-level profiler 210 includes any system capable of creating a code-level log of the interactions between application 208 and virtual machine 206. This code-level log can also include recording information associated with virtual machine 206, such as the number of live user-level threads, for a given point in the execution-process of application 208.

Platform-Test System

Figure 2B:
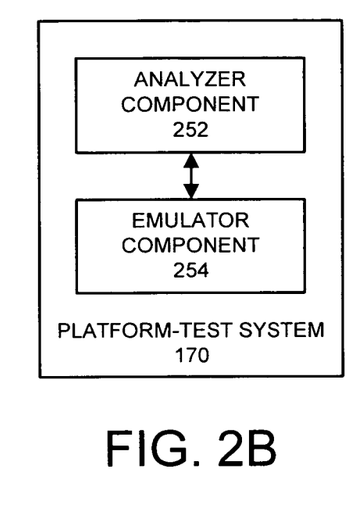
FIG. 2B illustrates a platform-test system in accordance with an embodiment of the present invention.

FIG. 2B illustrates a platform-test system 170 in accordance with an embodiment of the present invention. Platform-test system 170 includes analyzer component 252 and emulator component 254. Note that platform-test system 170 is capable of communicating with embedded device 120, client 110, database 150, and application-test system 180. Furthermore, platform-test system 170 is capable of retrieving a system-level log from client 110, embedded device 120, or database 150.

Analyzer component 252 can generally include any system that is capable of analyzing a system-level log to determine if a problem exists with embedded device 120, native layer 202, or virtual machine 206.

Emulator component 254 can generally include any system that is capable of using a system-level log to selectively play back or emulate interactions between virtual machine 206 and native layer 202. This enables platform-test system 170 to determine if a problem exists with embedded device 120, native layer 202, or virtual machine 206. Furthermore, using the system-level log, emulator component 254 can emulate virtual machine 206, or a portion of virtual machine 206 on client 110, or embedded device 140. This enables user 112 to simulate and test changes to embedded device 120 on client 110, and to test embedded device 140 without loading a full version of virtual machine 206 on client 110, or embedded device 140.

In one embodiment of the present invention, emulating virtual machine 206 involves emulator component 254 recreating the conditions under which system-level profiler 204 created the system-level log. This can involve configuring client 110 or embedded device 140 to match the device statistics specified in the system-level log. For example, emulator component 254 can create a stack in embedded device 140 to match the contents of a stack specified in the system-level log as a device statistic of embedded device 120 at a given point in the execution of virtual machine 206.

In one embodiment of the present invention, user 112 edits the system-level log and then uses emulator component 254 to emulate the virtual machine described by the edited system-level log. This enables user 112 to test variations of virtual machine 206 without the time-consuming task of recreating the conditions that user 112 wants for the tests of virtual machine 206 on embedded device 120.

Profiling a Virtual Machine

Figure 3:
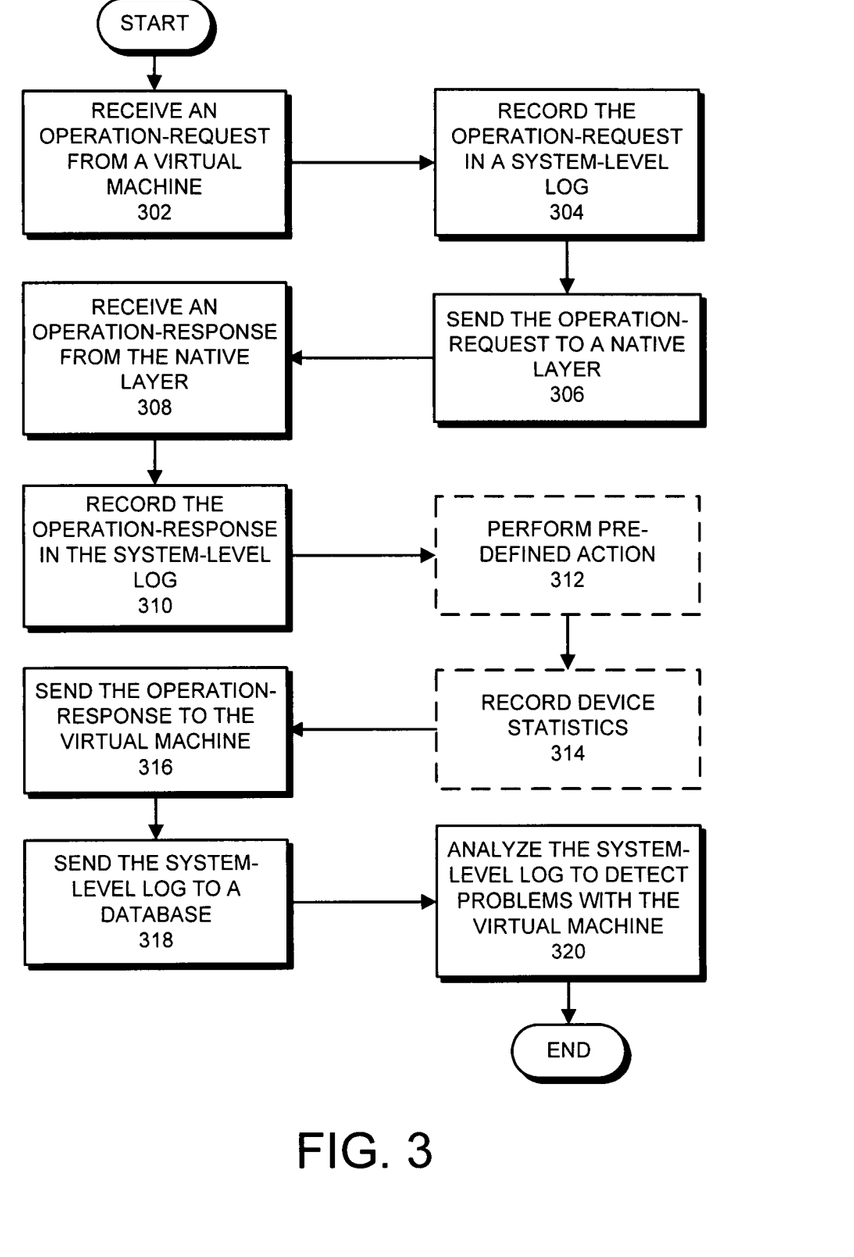
FIG. 3 presents a flow chart illustrating the process of profiling a virtual machine in accordance with an embodiment of the present invention.

FIG. 3 presents a flow chart illustrating the process of profiling a virtual machine in accordance with an embodiment of the present invention. The process begins when system-level profiler 204 receives an operation-request from virtual machine 206 (step 302). System-level profiler 204 then records the operation-request in a system-level log (step 304). Note that the system-level log can be stored on embedded device 120, on database 150, or on platform-test system 170. Next, system-level profiler 204 sends the operation-request to native layer 202 (step 306). Then, system-level profiler 204 receives an operation-response associated with the operation-request from native layer 202 (step 308). System-level profiler 204 then records the operation-response in the system-level log (step 310).

In one embodiment of the present invention, system-level profiler 204 performs a pre-defined action in response to receiving the operation-request from virtual machine 206, or the operation-response from native layer 202 (step 312). This pre-defined action can involve: recording the device statistics of embedded device 120; recording the amount of time between operation-requests; recording the amount of time between operation-responses; sending the system-level log to a server, or to database 150; and any other pre-defined action that can be performed in response to system-level profiler 204 receiving the operation-request or the operation-response known to those familiar with the art. This step is optional as is illustrated by the dashed lines surrounding step 312.

In one embodiment of the present invention, system-level profiler 204 records device statistics for embedded device 120 (step 314). In this embodiment, system-level profiler can record device statistics for embedded device 120 each time system-level profiler receives an operation-request or an operation-response, or after a pre-defined time-period. These device statistics can include: the amount of available memory; the amount of memory in use; the total amount of memory in embedded device 120; the page size of the memory; the current processor-load; a copy of the stack; a copy of the heap; and any other device statistics that can be recorded by system-level profiler 204 known to those familiar with the art. This step is optional as is illustrated by the dashed lines surrounding step 314.

In one embodiment of the present invention, system-level profiler 204 sends the operation-response to virtual machine 206 (step 316). Then, system-level profiler 204 sends the system-level log to database 150 (step 318). Next, system-level profiler 204 analyzes the system-level log to detect problems with virtual machine 206, native layer 202, or embedded device 120 (step 320).

In one embodiment of the present invention, platform-test system 170 analyzes the system-level log to detect problems with virtual machine 206, native layer 202, or embedded device 120.

In one embodiment of the present invention, the process illustrated in FIG. 3 facilitates logging of interactions between virtual machine 206 and native layer 202 to enable emulation of virtual machine 206 or a portion of virtual machine 206 on embedded device 140. This enables user 142 to test embedded device 140 without loading a complete virtual machine on embedded device 140. This is advantageous if embedded device 140 does not have the resources to store and execute a complete virtual machine and test-code.

Emulating a Virtual Machine

Figure 4:
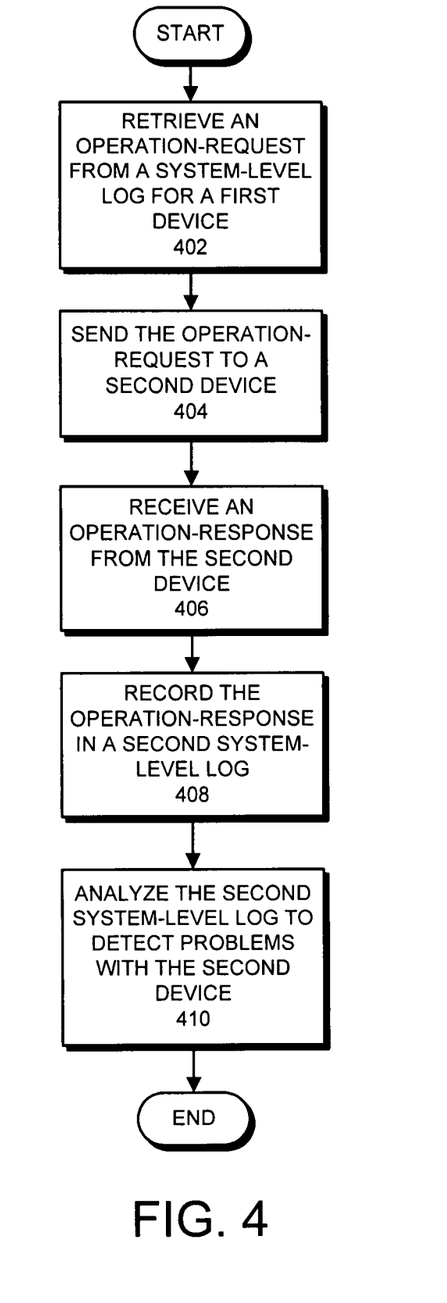
FIG. 4 presents a flow chart illustrating the process of emulating a virtual machine in accordance with an embodiment of the present invention.

FIG. 4 presents a flow chart illustrating the process of emulating a virtual machine in accordance with an embodiment of the present invention. The process begins when platform-test system 170 retrieves an operation-request from a system-level log associated with embedded device 120 (step 402). Platform-test system 170 then sends the operation-request to embedded device 140 (step 404). Then, platform-test system 170 receives an operation-response from embedded device 140 (step 406). Next, platform-test system 170 records the operation-response in a second system-level log (step 408). Note that this can involve recording the operation-request and device statistics for embedded device 140. Platform-test system 170 can then analyze the second system-level log to detect problems with embedded device 140 (step 410).

In one embodiment of the present invention, platform-test system 170 emulates a portion of virtual machine 206.

In one embodiment of the present invention, emulating virtual machine 206 involves platform-test system 170 using device statistics specified in the system-level log to recreate the conditions under which system-level profiler 204 created the system-level log.

Testing an Application

Figure 5:
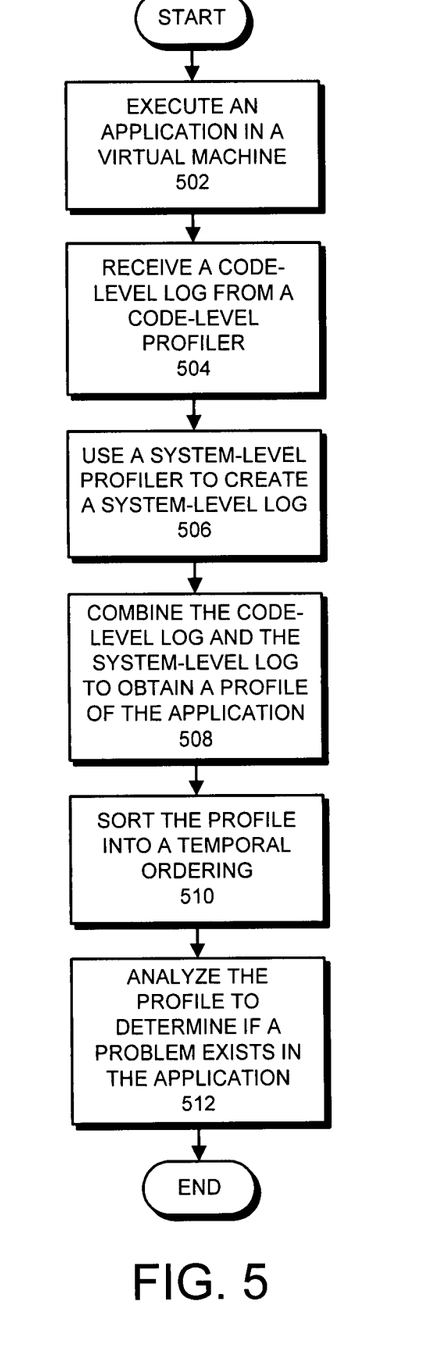
FIG. 5 presents a flow chart illustrating the process of testing an application running in a virtual machine in accordance with an embodiment of the present invention.

FIG. 5 presents a flow chart illustrating the process of testing an application running in a virtual machine 206 in accordance with an embodiment of the present invention. The process begins when application-test system 180 executes application 208 in virtual machine 206 (step 502). In response to executing the application, application-test system 180 receives a code-level log from code-level profiler 210 (step 504). While executing application 208, application-test system 180 uses system-level profiler 204 to create a system-level log (step 506). Then, application-test system 180 combines the code-level log and the system-level log to obtain a profile of application 208 (step 508). Next, application-test system 180 sorts the profile into a temporal ordering (step 510).

In one embodiment of the present invention, application-test system 180 sorts the profile into an ordering that user 112 specifies.

Then, application-test system 180 analyzes the profile to determine if a problem exists with application 208 (step 512). In one embodiment of the present invention, application-test system 180 analyzes the profile to determine if a problem exists with embedded device 120, or virtual machine 206.

In one embodiment of the present invention, analyzing the profile involves determining if a bottleneck associated with embedded device 120 executing application 208 exists. Note that this bottleneck can include: a memory-bottleneck; a processor-bottleneck; an output-bottleneck; an input-bottleneck; a software-related bottleneck; a hardware-related bottleneck; and any bottleneck that could interfere with the execution of application 208 known to those familiar with the art.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for profiling a virtual machine on an embedded device, the method comprising:
    executing an application in a virtual machine on an embedded device;
    while executing the application in the virtual machine on the embedded device:
    receiving an operation-request at a system-level profiler from the virtual machine on the embedded device;
    recording the operation-request in a first system-level log;
    sending the operation-request to a native layer on the embedded device;
    receiving an operation-response associated with the operation-request from the native layer;
    recording the operation-response in the first system-level log, wherein recording the operation-response comprises recording device statistics for the embedded device in the first system-level log;
    sending the operation-response from the system-level profiler to the virtual machine;
    after the application has finished executing, sending the first system-level log to a platform-test system on a second device, thereby enabling the platform-test system to:

use the first system-level log to emulate, on the second device, one or more interactions between the virtual machine and the native layer of the embedded device that occurred while application was executing in the virtual machine on the embedded device, wherein the emulation is performed without executing the application on the second device;

record the emulation of the interactions on the second device in a second system-level log; and determine if a problem exists on the second device at least in part by comparing flow patterns found in the first system-level log and the second system-level log;

wherein the second device is separate and different from the embedded device, and wherein the second device does not include a same virtual machine as the first device or does not include a virtual machine.

2. The method of claim 1, further comprising sending the first system-level log to a database.

3. The method of claim 1, wherein the native layer can be: an operating system; and a low-level code library.

4. The method of claim 1, further comprising:

performing a pre-defined action in response to receiving the operation-response, wherein the pre-defined action can involve:

recording device statistics for the embedded device;

recording the time between the operation-response and a second operation-response; and sending the first system-level log to a server.

5. The method of claim 1, further comprising analyzing the first system-level log to detect problems with the virtual machine.

6. A non-transitory computer-readable storage medium storing instructions that when executed by a computer cause the computer to perform a method for profiling a virtual machine on an embedded device, the method comprising:

executing an application in a virtual machine on an embedded device;

while executing the application in the virtual machine on the embedded device:

receiving an operation-request at a system-level profiler from the virtual machine on the embedded device;

recording the operation-request in a first system-level log;

sending the operation-request to a native layer on the embedded device;

receiving an operation-response associated with the operation-request from the native layer, wherein recording the operation-response comprises:

recording device statistics for the embedded device in the first system-level log;

recording the operation-response in the first system-level log;

sending the operation-response from the system-level profiler to the virtual machine;

after the application has finished executing, sending the first system-level log to a platform-test system on a second device, thereby enabling the platform-test system to:

use the first system-level log to emulate, on the second device, one or more interactions between the virtual machine and the native layer of the embedded device that occurred while application was executing in the virtual machine on the embedded device, wherein the emulation is performed without executing the application on the second device;

record the emulation of the interactions on the second device in a second system-level log; and determine if a problem exists on the second device at least in part by comparing flow patterns found in the first system-level log and the second system-level log;

wherein the second device is separate and different from the embedded device, and wherein the second device does not include a same virtual machine as the first device or does not include a virtual machine.

7. The non-transitory computer-readable storage medium of claim 6, wherein the native layer can be: an operating system; and a low-level code library.

8. The non-transitory computer-readable storage medium of claim 6, wherein the method further comprises performing a pre-defined action in response to receiving the operation-response, wherein the pre-defined action can involve:

recording device statistics for the embedded device;

recording the time between the operation-response and a second operation-response; and sending the first system-level log to a server.

9. An apparatus configured for profiling a virtual machine on an embedded device, comprising:

a memory; and a processor coupled to the memory, while the application is executing in the virtual machine on the embedded device, the processor is operative to:

execute an application in a virtual machine on an embedded device;

receive an operation-request at a system-level profiler from the virtual machine on the embedded device;

record the operation-request in a first system-level log;

send the operation-request to a native layer on the embedded device;

receive an operation-response associated with the operation-request from the native layer;

record the operation-response in the first system-level log, wherein, while recording the operation-response, the recording mechanism is configured to record device statistics for the embedded device in the first system-level log; and send the operation-response from the system-level profiler to the virtual machine; and a sending mechanism configured to, after the application has finished executing, send the first system-level log to a platform-test system on a second device, thereby enabling the platform-test system to:

use the first system-level log to emulate, on the second device, one or more interactions between the virtual machine and the native layer of the embedded device that occurred while application was executing in the virtual machine on the embedded device, wherein the emulation is performed without executing the application on the second device;

record the emulation of the interactions on the second device in a second system-level log; and determine if a problem exists on the second device at least in part by comparing flow patterns found in the first system-level log and the second system-level log;

wherein the second device is separate and different from the embedded device, and wherein the second device does not include a same virtual machine as the first device or does not include a virtual machine.

10. The method of claim 1, wherein the device statistics comprise a copy of a stack and a copy of a heap for the embedded device, wherein the second device uses the device statistics to create conditions for emulating the virtual machine by matching a stack for the second device to the copy of the stack and matching a heap for the second device to the copy of the heap, and wherein the stack for the second device and the heap for the second device correspond to a virtual machine on the second device that emulates the virtual machine on the embedded device.

11. The method of claim 1, wherein the device statistics comprise a processor load for the embedded device, wherein the second device uses the device statistics to create conditions for emulating the virtual machine by matching a processor load for the second device to the processor load for the embedded device, and wherein the processor load for the second device corresponds to a virtual machine on the second device that emulates the virtual machine on the embedded device.

12. The method of claim 1, wherein the device statistics comprise an amount of memory for the embedded device;

and wherein the method further comprises:

matching an amount of memory for the second device to the amount of memory for the embedded device, wherein the amount of memory for the second device corresponds to a virtual machine on the second device that emulates the virtual machine on the embedded device.

13. The method of claim 1, wherein the device statistics comprise a copy of at least one of a stack and a heap for the embedded device;

and wherein the method further comprises:

matching at least one of a stack and a heap for the second device to the copy of the at least one of the stack and the heap for the embedded device, wherein the at least one of the stack and the heap for the second device corresponds to a virtual machine on the second device that emulates the virtual machine on the embedded device.

14. The method of claim 1, wherein the device statistics comprise a memory page size for the embedded device;

and wherein the method further comprises:

matching a memory page size for the second device to the memory page size for the embedded device, wherein the memory page size for the second device corresponds to a virtual machine on the second device that emulates the virtual machine on the embedded device.

15. The method of claim 1, further comprising:

receiving a code level log that includes interactions of the application with the virtual machine from the embedded device from a code level profiler;

receiving a second operation-request at the code-level profiler from the application executing at the virtual machine;

recording the second operation-request in the code-level log;

sending the second operation-request to the virtual machine on the embedded device;

receiving a second operation-response associated with the second operation-request from the virtual machine;

recording the second operation-response in the code-level log;

sending the second operation-response from the code-level profiler to the application; and sending the code-level log to the second device, wherein the code-level log includes a profile of the interactions of the application with the virtual machine and does not include a profile of interactions of the virtual machine with the native layer.

* * * * *

UNITED STATES PATENT AND TRADEMARK OFFICE
CERTIFICATE OF CORRECTION

PATENT NO.         : 8,997,048 B1                                       Page 1 of 1
APPLICATION NO.    : 11/705941
DATED              : March 31, 2015
INVENTOR(S)        : Pomerantz et al.

It is certified that error appears in the above-identified patent and that said Letters Patent is hereby corrected as shown below:

On the title page, item 56

On second page, column 2, other publications, line 3, delete "Form" and insert -- From --, therefor.

Signed and Sealed this
Third Day of November, 2015

Michelle K. Lee
*Director of the United States Patent and Trademark Office*